United States Patent
Yoshimura et al.

(10) Patent No.: US 6,381,612 B2
(45) Date of Patent: Apr. 30, 2002

(54) LINK INFORMATION MAINTENANCE AND MANAGEMENT METHOD

(75) Inventors: Mitsuhiko Yoshimura, Settsu; Maki Mori, Toyonaka; Hiroyuki Okuda, Ikeda; Yoshiaki Yoshikawa, Ikoma, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/870,742

(22) Filed: Jun. 1, 2001

Related U.S. Application Data

(63) Continuation of application No. 09/621,616, filed on Jul. 21, 2000, now Pat. No. 6,266,676, which is a continuation of application No. 09/072,453, filed on May 5, 1998, now Pat. No. 6,169,995, which is a continuation-in-part of application No. 08/405,987, filed on Mar. 17, 1995, now Pat. No. 5,857,199.

(30) Foreign Application Priority Data

Mar. 17, 1994 (JP) .............................. 6-046721
May 8, 1997 (JP) .............................. 9-134427

(51) Int. Cl.$^7$ .............................. G06F 17/30
(52) U.S. Cl. .................. 707/104; 707/529; 707/501; 707/3; 701/207; 701/208
(58) Field of Search ................. 707/104, 541, 707/529, 501, 500, 505, 3; 345/358; 701/207, 214, 216, 217, 209, 211, 96, 208, 200; 342/357; 340/990

(56) References Cited

U.S. PATENT DOCUMENTS

| | | | |
|---|---|---|---|
| 4,752,773 A | 6/1988 | Togawa et al. | 345/156 |
| 4,920,337 A | 4/1990 | Kuo | 345/507 |
| 4,931,957 A | 6/1990 | Takagi et al. | 358/453 |
| 5,029,112 A | 7/1991 | Sakamoto et al. | 395/118 |
| 5,060,280 A | 10/1991 | Mita et al. | 382/283 |
| 5,123,088 A | 6/1992 | Kasahara et al. | 345/357 |

(List continued on next page.)

FOREIGN PATENT DOCUMENTS

| | | |
|---|---|---|
| JP | 6-28438 | 2/1994 |
| JP | 7-73297 | 3/1995 |
| JP | 9-282330 | 10/1997 |
| JP | 9-297529 | 11/1997 |

OTHER PUBLICATIONS

Pixel, No. 56, Self–gaoverning Body Graphical System "Aristown", pp. 73–78.

The Japan Society of Mechanical Engineers, 1986, "Image Processing and Pattern Measuring Technology", Asakura Shoten, pp. 82–83.

Pattern Understanding, 1987, published by Ohmsha Ltd., 1987, pp. 202–211.

*Primary Examiner*—Jean M. Corrielus
(74) *Attorney, Agent, or Firm*—Mattingly, Stanger & Malur, P.C.

(57) ABSTRACT

A link information management method which is capable of reducing the number of steps of a link maintenance processing of link information indicating a corresponding relationship between geographical information in a geographical information system and attribute information. To realize the method, geographical information are compared and judged by translating first geographical information based on corresponding points judged as the same points inputted on first and second geographical information by an operator. Further, update days of link information and attribute information are compared and judged, and current link information which causes the second geographical information and the attribute information to be correlated with each other is generated based on the compared and judged results of the link information and the attribute information. Then, attribute information and a closed area on the second geographical information are displayed by using the current link information thus generated.

18 Claims, 6 Drawing Sheets

U.S. PATENT DOCUMENTS

| | | | |
|---|---|---|---|
| 5,150,458 A | 9/1992 | Masuzaki et al. | 345/435 |
| 5,253,337 A | 10/1993 | Hirose | 395/357 |
| 5,420,703 A | 5/1995 | Sakai et al. | 358/501 |
| 5,420,968 A | 5/1995 | Johri | 345/433 |
| 5,444,550 A | 8/1995 | Enokida et al. | 358/453 |
| 5,499,327 A | 3/1996 | Satoh | 395/135 |
| 5,526,520 A | 6/1996 | Krause | 707/104 |
| 5,537,132 A | 7/1996 | Teraoka et al. | 345/133 |
| 5,625,771 A | 4/1997 | Sakaguchi et al. | |
| 5,625,810 A | 4/1997 | Kurosu et al. | 707/1 |
| 5,857,199 A | 1/1999 | Tamano et al. | 707/104 |
| 6,169,995 B1 | 1/2001 | Yoshimura et al. | 707/104 |

FIG.3A

|  1031 | 1032 | 1033 |
|---|---|---|
| RESIDENTS ID | NAME | UPDATE DAY |
| 0 | HITACHI TARO | H8/12/1 |
| 1 | OSAKA HANAKO | H8/12/1 |
| 2 | KANSAI ICHIRO | H8/12/1 |
| 3 | TANAKA JIRO | H9/2/1 |

RESIDENTS INFORMATION ....1030

FIG.3B

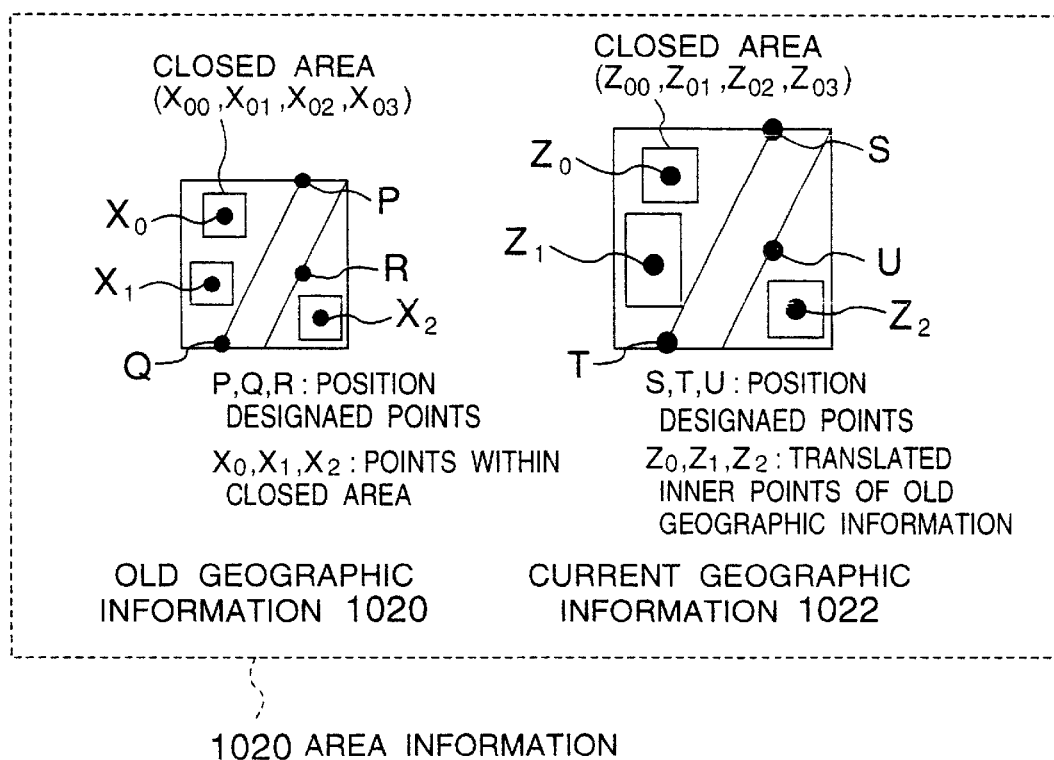

CLOSED AREA $(X_{00}, X_{01}, X_{02}, X_{03})$

CLOSED AREA $(Z_{00}, Z_{01}, Z_{02}, Z_{03})$

P,Q,R : POSITION DESIGNAED POINTS $X_0, X_1, X_2$ : POINTS WITHIN CLOSED AREA

S,T,U : POSITION DESIGNAED POINTS $Z_0, Z_1, Z_2$ : TRANSLATED INNER POINTS OF OLD GEOGRAPHIC INFORMATION

OLD GEOGRAPHIC INFORMATION 1020

CURRENT GEOGRAPHIC INFORMATION 1022

1020 AREA INFORMATION

FIG.3C

OLD LINK INFORMATION 1011

| ID | INNER POINT | CLOSED AREA | RESIDENTS ID | UPDATE DAY |
|---|---|---|---|---|
| 0 | $X_0$ | $X_{00}, X_{01}, X_{02}, X_{03}$ | 0 | H9/1/1 |
| 1 | $X_1$ | $X_{10}, X_{11}, X_{12}, X_{13}$ | 1 | H9/1/1 |
| 2 | $X_2$ | $X_{20}, X_{11}, X_{12}, X_{13}$ | 2 | H9/1/1 |

CERTAIN LINK INFORMATION 1012

| ID | INNER POINT | CLOSED AREA | RESIDENTS ID | UPDATE DAY |
|---|---|---|---|---|
| 0 | $Z_0$ | $Z_{00}, Z_{01}, Z_{02}, Z_{03}$ | 0 | H9/3/1 |

UNCERTAIN LINK INFORMATION 1013

| ID | INNER POINT | CLOSED AREA | RESIDENTS ID | UPDATE DAY |
|---|---|---|---|---|
| 0 | $Z_1$ | $Z_{10}, Z_{11}, Z_{12}, Z_{13}$ | 1 | H9/3/1 |

FAILURE LINK INFORMATION 1014

| ID | INNER POINT | CLOSED AREA | RESIDENTS ID | UPDATE DAY |
|---|---|---|---|---|
| 0 | $Z_2$ | $Z_{20}, Z_{21}, Z_{22}, Z_{23}$ | 2 | H9/3/1 |
| 1 | NONE | NONE | 3 | H9/3/1 |

LINK INFORMATION 1010

FIG.4

| SIMILARITY LEVEL OF AREA SHAPE / COMPARE UPDATE DAY | CERTAIN AREA | UNCERTAIN AREA | FAILURE AREA |
|---|---|---|---|
| RESIDENTS INFORMATION ≤ OLD LINK INFORMATION | CERTAIN | UNCERTAIN | FAILURE |
| RESIDENTS INFORMATION > OLD LINK INFORMATION | UNCERTAIN | UNCERTAIN | FAILURE |

TABLE OF LINK INFORMATION GROUP

LINK INFORMATION MAINTENANCE AND MANAGEMENT METHOD

CROSS-REFERENCE TO RELATED APPLICATIONS

This is a continuation application of U.S. Ser. No. 09/621,616, filed Jul. 21, 2000, now U.S. Pat. No. 6,266,676, which is a continuation application of U.S. Ser. No. 09/072,453, filed May 5, 1998, now U.S. Pat. No. 6,169,995, which is a continuation-in-part of application of U.S. Ser. No. 08/405,987, filed on Mar. 17, 1995 (now U.S. Pat. No. 5,857,199) and assigned to the present assignee. The disclosure of that application is incorporated herein by reference.

BACKGROUND OF THE INVENTION

The present invention relates to a link information management method for use with an apparatus or a system (e.g. geographical information system) which handles area information (geographical information, document, drawings, etc.) and attribute information (information stored in database or file, etc.).

Geographical information systems have hitherto been known as a system for supporting data retrieval/reference by using a corresponding relationship between geographical information and attribute information. The geographical information system has a fundamental function to retrieve attribute information such as geographical information and residents information from each other. For example, the geographical information system is able to display residents information by designating a house on a map. Conversely, the geographical information system is able to display a house of a corresponding resident on a map by designating a name of resident in residents information. As the geographical system having the above-mentioned functions, there has hitherto been known a self-governing body geographical system "ARISTOWN" (PIXEL, No. 56, pp. 73–78) having a function to make use of maps and attribute information such as road information and land information in association with each other.

To realize the fundamental function of the geographical information system, a correspondence relationship (hereinafter referred to as "link information") between geographical information and attribute information should be saved in any forms. Therefore, when the operation of the geographical information system is started, a registration work for registering link information is indispensable for the operation of the geographical information system. Further, during the geographical information system is operated, a maintenance for each of geographical information, attribute information and link information becomes necessary. In a link information registration processing or a link information maintenance processing, since link information is registered and changed while a corresponding relationship between geographical information and attribute information is constantly maintained, the link information registration processing and the link information maintenance processing become cumbersome as compared with the case where geographical information and attribute information are each registered and changed. Moreover, as the scale and the kind of geographical information and attribute information to be handed increase, the record number of registered link information increases in a combinatorial mathematics fashion. For the above-mentioned reason, there are required many steps of link information registration and maintenance work. To solve this problem, there has been considered a support technology in order to decrease the number of steps of the link information registration and maintenance work.

For example, as a support technology for supporting a link information registration, U.S. Pat. No. 5,625,771 describes a character cursor function. According to the character cursor function, when geographical information and attribute information are associated with each other, an amount of an operator eye movement of on a display screen can be decreased and an efficiency of a link information registration processing can be increased by displaying a part of attribute information near a mouse cursor.

Also, as a technology for supporting a link information maintenance, there is a technology (JP-A-7-73297) for automatically maintaining names of residents on maps by using link information between residents information and geographical information. According to this technology, when a resident of a certain house is changed from the state that geographical information and residents information with respect to the above-mentioned house are linked, for example, a written name of a resident contained in geographical information to which changed resident information should be linked can be changed automatically.

Further, as another technology for supporting a link information maintenance, there has hitherto been known a technology (JP-A-6-28438) for executing a link maintenance between an old map and a new map by correcting position information of link information corresponding to a closed area on the old map. According to the above-mentioned technology, when link information of the old map and the new map in which position information is slightly changed with respect to the old map is corrected (e.g. a map of 1996 edition is changed to a map of 1997 edition), position information which was included in link information of the old map is corrected and then copied to the new map.

As described above, when the geographical information system is operated, there is examined a technology for supporting an access and maintenance of link information.

On the other hand, the above-mentioned conventional technologies are not satisfactory in supporting the access and maintenance of link information. For example, the above-mentioned character cursor function is unable to support the case where there exists link information that has already been registered. That is, when geographical information is updated under the situation that link information has been already registered on geographical-information, the character cursor function is able to only display attribute information obtained before the link information is registered near a cursor. Therefore, link information with respect to current geographical information has to be re-registered one more time from the beginning. That is, the link information that has already been registered cannot be used effectively.

JP-A-7-73297 describes a technology for updating geographical information and residents information when there already existed link information. However, this technology has no support function to support the case where residents information is registered additionally after the link information has been registered. Considering this technology from a system operation standpoint, when new residents information is additionally registered after link information has been registered, it is frequently observed that there occurs residents information which is not corresponding to geographical information (i.e. there exists no link information). However, according to the method described in JP-A-7-73297, the residents information that is additionally registered after the link information has been registered is missed, and hence the residents information that was additionally registered cannot be supported by the link maintenance processing.

Also, JP-A-6-28438 is unable to maintain link information when a scale or a direction is different between old and current geographical information. On the other hand, considering this technology from a system operation standpoint, a class of geographical information that is made corresponding to attribute information also should be changed as business contents handled by the geographical information system are changed. Also, since a business becomes complicated, detailed geographical information become necessary so that a map of scale, 1–50,000 should be changed to a map of scale, 25,000. However, according to the method described in JP-A-5-28438, link information is maintained in a manner in which position information of link information registered on the old map is succeeded substantially as it is. Therefore, when scales or directions of old geographical information and current geographical information are considerably different from each other, link information registered on the old geographical information cannot be correctly changed to link information of current geographical information.

Incidentally, JP-A-9-282330 describes a system for supporting a construction of database by associating database and document as a system similar to the geographical information system. Also in the system described in JP-A-9-282330, link information by which database and document are associated with each other should be registered and maintained similarly to the geographical information system. As a result, there arises a problem similar to the above-mentioned problem from a standpoint of the number of steps in the link information registration and maintenance processing similarly to the geographical information system.

SUMMARY OF THE INVENTION

It is an object of the present invention to solve the above-mentioned problems encountered with the conventional technologies and to reduce the number of steps in a link maintenance processing in a geographical information system or the like.

In order to attain the above objects of the present invention, according to a first aspect of the invention, there is provided a link information management method using a computer system including a CPU, an input device, a display device and having a storage device storing first area information concerning a first area including a closed area, second area information concerning a second area including a closed area, attribute information correlated with said first area information and old link information indicative of a corresponding relationship between said first area information and said attribute information. Said link information management method comprises the steps of:

a) displaying the first area and the second area in accordance with the first area information and the second area information, respectively, and obtaining position information of corresponding points of a predetermined number indicative of the same positions instructed on the first area and the second area through said input device;

b) obtaining a translation equation for translating the first area information into the second area information by using the position information of corresponding points and judging similarity between the closed area of the first area information and the closed area of the second area information translated based on the translation equation;

c) generating current link information which causes the second area information and the attribute information to be correlated with each other based on the judged results of the similarity and the old link information; and d) displaying the attribute information and the closed area on the second area on the display device by using the current link information thus generated.

When the aspect of the invention is applied to a geographical information system, for example, the first area information is old geographical information (geographical information in which link information has been already registered), and the second area information is current geographical information (geographical information in which link information has not yet been registered). When a similarity of closed area is judged, a coordinate transformation processing is executed between the old geographical information and the current geographical information based on the corresponding points designated by an operator, and a similarity is judged by comparing closed areas included in the old geographical information and the current geographical information transformed on the basis of the coordinate transform processing. Incidentally, of attribute information, newly-registered attribute information (information having no link information) may be displayed on the display device.

According to a second aspect of the invention, in the first aspect, the old link information and the attribute information are compared and grouped by using registration/update day in the step c) and the current link information is generated based on compared and grouped results obtained by the registration/update day, judged results of the similarity and the old link information in the step d).

According to a third aspect of the invention, in the first or second aspect, current link information is generated so as to have a class indicative of whether or not generated current link information is certain current link information in the step c), attribute information linked by the current link information and the closed area on the second area are displayed in a first mode or a second mode in response to whether or not generated current link information is certain current link information, and a class indicating whether or not corresponding current link information is certain current link information is changed by operating the displayed attribute information and closed area on the second area in a predetermined manner in the step d).

According to a fourth aspect of the invention, in the first or second aspect, a similarity is judged by using character recognized results obtained within closed areas of the closed area of the first area information and the closed area of the second area information in the step b), and current link information is generated by using the character recognized results in the step c).

According to a fifth aspect of the invention, in the first or second aspect, a data format of the first area information and a data format of the second area information are different from each other. For example, even when old geographical information is of the vector format and current geographical information is of the image format, link information can be changed based on respective position information.

BRIEF DESCRIPTION OF THE DRAWINGS

FIG. 3A is a diagram showing residents information;

FIG. 3B is a diagram showing area information;

FIG. 3C is a diagram showing link information;

FIG. 4 is a diagram showing a link information grouped table; and

DESCRIPTION OF THE PREFERRED EMBODIMENT

An embodiment of the present invention will hereinafter be described with reference to the drawings. A link information management method in a system which manages geographical information and residents information in association with each other will be described hereinafter. Incidentally, geographical information is information indicative of geographical features, such as roads and buildings, and contains closed area information, such as a building displayed as a closed area.

Figure 1:
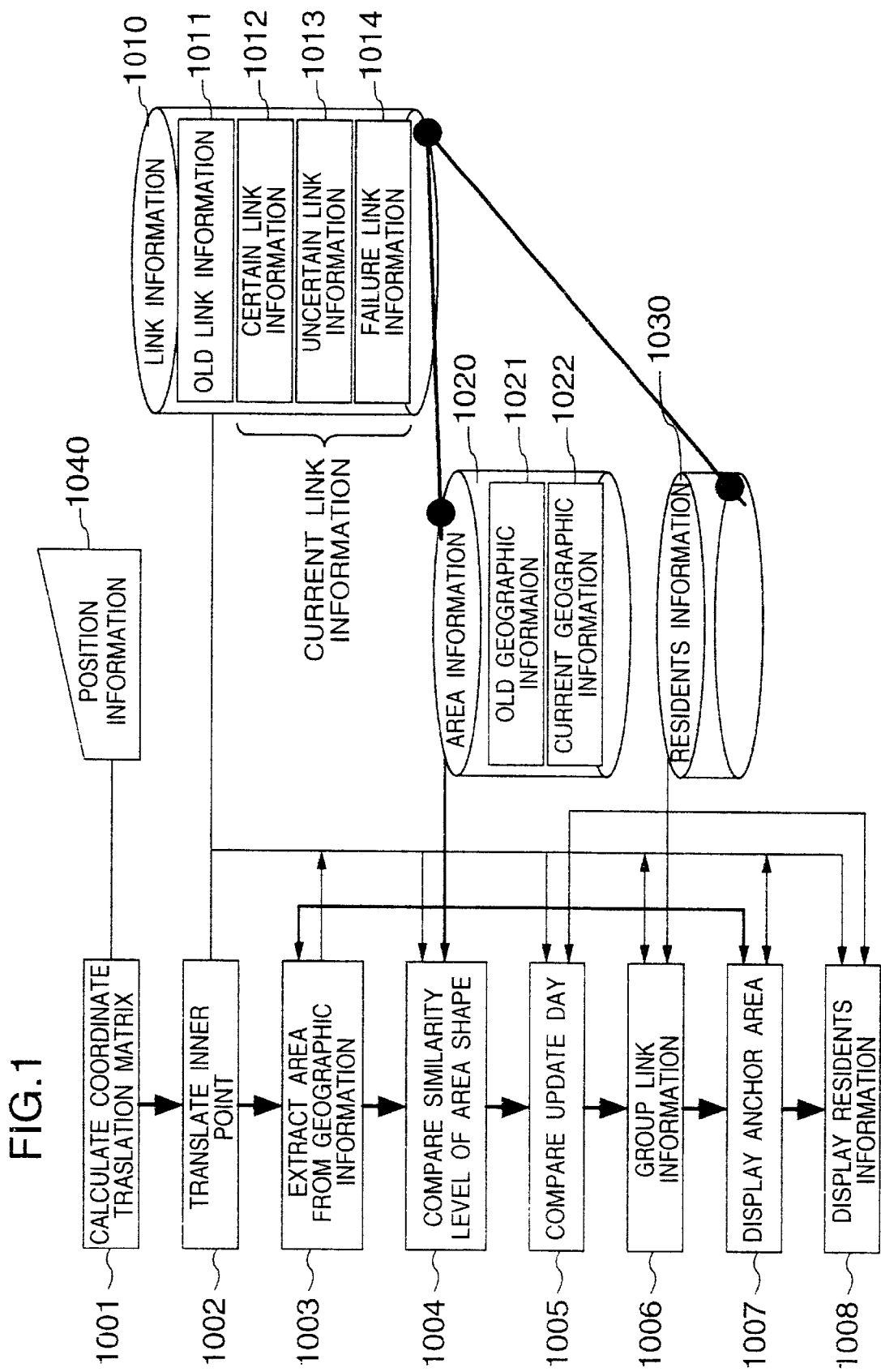
FIG. 1 is a general flowchart of the present invention.

FIG. 1 of the accompanying drawings shows a processing outline according to this embodiment by a flowchart. Initially, stored information used in this embodiment will be described.

In area information 1020, there are stored two kinds of geographical information called old geographical information 1021 and current geographical information 1022. The old geographical information 1021 is geographical information in which a corresponding relationship between a closed area on geographical information and residents information 1030 exists previously as link information 1010. On the other hand, current geographical information 1022 is geographical information in which the link information 1010 indicative of a corresponding relationship between a closed area on geographical information and residents information does not exist before the processing which will be described below. Incidentally, as a format for storing geographical information, there are known formats such as a vector format (format for storing area information by using an algebra curve) and an image format (format for expressing area information by an array of pixels). The format for storing geographical information according to this embodiment may be any of the vector format, the image format and other formats as long as the position of the closed area can be determined. In particular, since the closed area can be extracted from an image processing technology which will be described later on, the geographical information of the image format may be handled in substantially the same manner as the geographical information of the vector format is handled according to this embodiment. That is, in this embodiment, it is permitted that the formats for storing the old geographical information 1021 and the current geographical information 1022 may be different from each other. FIG. 3B shows an example of the old geographical information 1021 and the current geographical information 1022 stored as the area information 1020.

In the residents information 1030 shown in FIG. 1, there is stored residents personal information, such as names and address of residents. FIG. 3A shows an example of an arrangement of residents information 1030. The residents information 1030 shown in FIG. 3A includes a residents ID 1031, a name 1032 and an update day 1033. In the residents ID 1031, there is stored a unique key which is used to uniquely identify the record of the residents information 1030. In the update day 1033, there is stored an update day of each record of residents information.

The link information 1010 shown in FIG. 1 is information for holding a corresponding relationship between the residents information 1030 and the area information 1020. As shown in FIG. 1, the link information 1010 includes old link information 1011 and current link information. The current link information is grouped by the following processing to provide certain link information 1012, uncertain link information 1013 and failure link information 1014. FIG. 3C shows an example of an arrangement of link information. As shown in FIG. 3C, although these four link information are stored as different table files, their data structures as the link information are the same.

As shown in FIG. 3C, the link information 1010 includes an ID 4010, an inner point 4020, a closed area 4030, a residents ID 4040 and an update day 4050. In the ID 4010, there is stored a unique key which is used to uniquely identify each record of link information. In the closed area 4030, there is stored information which is used to specify a polygonal area on the map. In the inner point 4020, there is stored a point (representing point) included in the closed area 4030 as the inner point. For example, position information (X00, X01, X02, X03) of vertexes composing the closed area on the old geographical information 1021 of FIG. 3B are stored in a closed area 4030 of the old link information 1011, and the point X0 within this closed area is stored in the inner point 4020 of the old link information 1011. In the residents ID 4040, there are stored residents ID of residents co-responding to the closed area described in the closed area 4030 of a residents ID 1031 of the residents information 1030. By such link information 1010, the closed area on the geographical information (area information 1020) is made corresponding to the residents information 1030. Incidentally, in the following description, of the closed areas on the geographical information 1020, a closed area which is made corresponding to the residents information 1030 by the link information 1010 is referred to as an anchor area. In an update day 4050 of the link information 1010, there is stored update day of each record.

Figure 2:
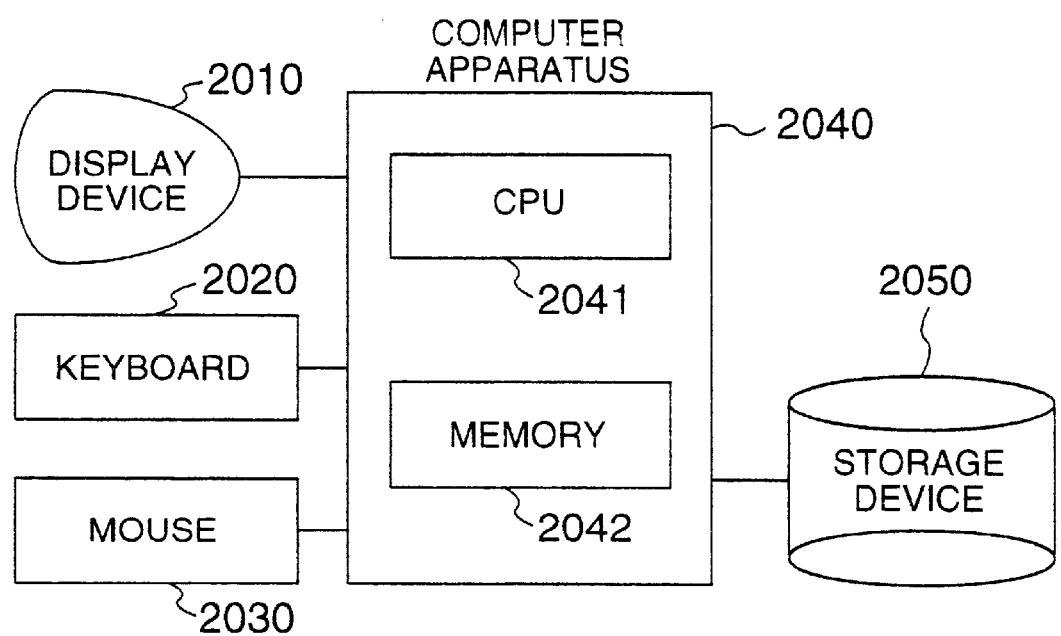
FIG. 2 is a block diagram showing a computer system which carries out the present invention.

In FIG. 1, position information 1040 is information which is inputted when an operator designates a position on old geographical information or current geographical information displayed on a screen of a display device by operating an input device, such as a keyboard 2020 or a mouse 2030 shown in FIG. 2.

Before describing each Processing shown in FIG. 1, a system arrangement and an example of a picture according to this embodiment will be described below.

FIG. 2 is a block diagram showing a computer system which carries out this embodiment. The system according to this embodiment includes a display device 2010, a keyboard 2020, a mouse 2030, a computer apparatus 2040 and a storage device 2050. The computer apparatus 2040 includes a CPU (central processing unit) 2041 and a memory 2042. Each processing shown in FIG. 1 is executed by using the system apparatus shown in FIG. 2. In the storage device 2050, there are stored the residents information 1030, the link information 1010 and the area information 1020 shown in FIG. 1. Incidentally, if the memory 2024 has a sufficiently large storage capacity, then the residents information 1030, the link information 1010 and the area information 1020 may all be stored in the memory 2042. Also, a program for executing each processing shown in FIG. 1 is stored not only in the memory 2042 but also may be stored in a medium such as floppy disks. A suitable storage device such as a CD-ROM, DVD-ROM and MO may be used as the storage device 2050, and the area information 1020 represented by geographical information may be stored in such a storage device.

Figure 5:
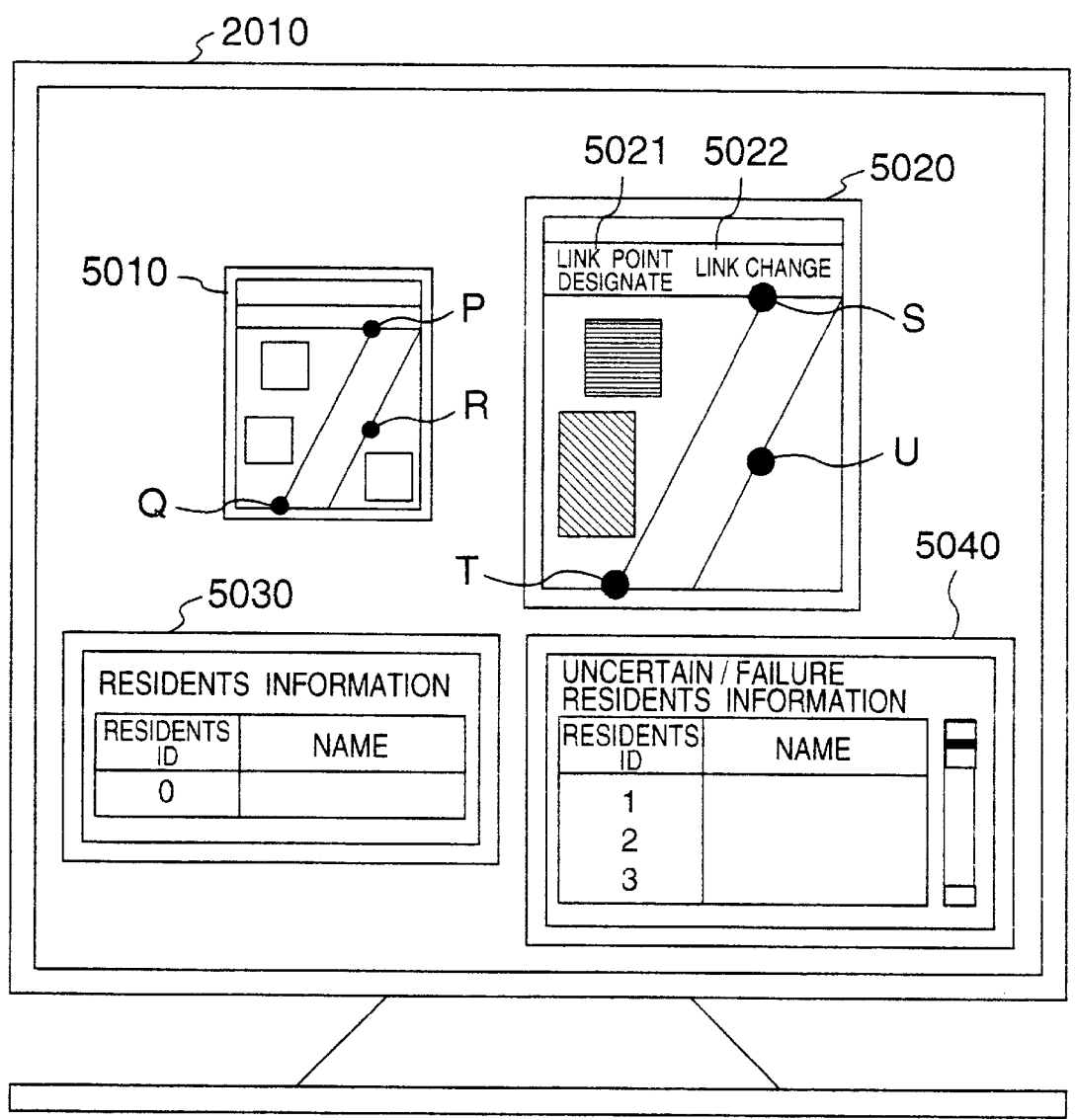
FIG. 5 is a diagram showing an example of a picture displayed on a screen of a display device according to the present invention.

FIG. 5 shows an example of a picture displayed on the display device 2010 according to this embodiment. An operation procedure according to this embodiment will hereinafter be described with reference to FIG. 5.

The old geographical information 1021 of FIG. 3B is displayed on an old geographical information display screen 5020 shown in FIG. 5. The current geographical information 1022 of FIG. 3B is displayed on a current geographical information display screen 5020 of FIG. 5. An operator selects "LINK POINT DESIGNATE" 5021 of the menu shown in FIG. 5, and designates three points (e.g. P, Q, R) on the display screen 5010 of the old geographical information 1021. Then, the operator designates three points which are judged as "THE SAME POINTS AS THOSE DESIGNATED POINTS ON THE OLD GEOGRPHICAL INFORMATION 1021" on the display screen 5020 of the current geographical information 1022. FIG. 5 shows the case in which the operator designated points S, T, U as points corresponding to the points P, Q, R.

Incidentally, although FIG. 5 displays maps in different scales in the display screen 5010 of the old geographical information and the display screen 5020 of the current geographical information, in the system according to this embodiment, the old geographical information display screen 5010 and the current geographical information display screen 5020 may be displayed in an enlarged or reduced scale, respectively. When the corresponding points are designated by using this function, if both maps are displayed on the screens in such a manner that the scales become coincident with each other on both display screens by properly changing the reduction ratios of both maps, then a corresponding relationship between the both maps becomes easy to understand. Also, in this embodiment, although the display screens 5010 and 5020 which display the whole of the area information 1020 for the sake of convenience, the whole of the area information 1020 need not be displayed on the screen. The area information 1020 may be displayed in the format in which the corresponding points can be inputted such as when the area information 1020 is displayed partly. Furthermore, the old geographical information 1021 and the current geographical information 1022 may be displayed on the display area of the same window in an overlapping fashion. Incidentally, in this embodiment, even when the corresponding points are inputted to the partial area of geographical information, link information outside the display screen may be changed by other link information by a processing which will be described later on.

Then, when the operator selects "LINK CHANGE" 5022 on the menu, the processings 1001 to 1008 shown in FIG. 1 are executed. The system generates certain link information 1012, uncertain link information 1013 and failure link information 1014 shown in FIG. 3C from the old link information 1011 shown in FIG. 3C. Then, anchor areas on the current geographical information 1022 are displayed by colors such as blue or yellow in response to the classes of the link information thus generated. The certain link information is link information in which a link between residents information and geographical information is made certain; the uncertain link information is link information in which a link between residents information and geographical information will be made certain probably although is not judged to be certain; and the failure link information is link information in which residents information that could not be linked to geographical information are stored. When the operator selects an anchor area (closed area which is made corresponding to the residents information 1030) on the current geographical information 1022 by using the mouse 2030, the content of the residents information 1030 corresponding to that anchor area is displayed on the residents information display screen 5030.

On the other Land, a list of the residents information 1030 corresponding to the uncertain link information 1013 and the failure link information 1012 is displayed on "UNCERTAIN/FAILURE RESIDENTS INFORMATION DISPLAY SCREEN" 5040. In this list, residents names which are made corresponding by the uncertain link information 1013 are displayed in the form such that they can be distinguished from residents names which are made corresponding by the failure link information 1014. In the example of FIG. 5, "大阪花子 (OSAKA HANAKO in Roman expression)" displayed in italic characters is residents name which is made corresponding by the uncertain link information 1013. Remaining "関西一郎 (KANSAI ICHIRO)" and "田中次郎 (TANAKA JIRO)" are residents names which are made corresponding by the failure link information 1012. Incidentally, instead of displaying residents names by different fonts, residents names may be distinguished by different colors.

The processing in this embodiment will hereinafter be described with reference to FIG. 1 and the display examples of FIG. 5. The processing according to this embodiment includes a calculate coordinate translation matrix 1001, a translate inner point 1002, an extract area from geographic information 1003, a compare similarity level of area shape 1004, a compare update day 1005, a group link information 1006, a display anchor area 1007, and a display residents information 1008.

In the calculate coordinate translation matrix 1001, on the basis of the position information of point sequences (P, Q, R) and (S, T, U) which are designated on the screen of FIG. 5 by the operator, a two-dimensional matrix M and a two-dimensional vector (longitudinal matrix) V which satisfy the following equation. The following components p, q, r, s, t and u are expressed by two-dimensional vectors (longitudinal matrix) which have position information of point sequences (P, Q, R) and (S, T, U) as components as:

$M \cdot p + V = s, \; M \cdot q + V = t, \; M \cdot r + V = u$

According to a solution of simultaneous equations, the above-mentioned M, V can be obtained from the position information of the corresponding three points (P, Q, R) and (S, T, U). Incidentally, assuming several premises between geographical information, then the number of the designated points on the display screen can be reduced to one or two points. For example, if magnifying powers of lengths and breadths in the old geographical information 1021 and the current geographical information 1022 are equal to each other, respectively, then M is given as a rotation matrix multiplied by a constant. Thus, M, V can be calculated by designating only two points on the display screens 5010 and 5020. Also, if the magnifying powers of lengths and breadths in the old geographical information 1021 and the current geographical information 1022 are equal to each other, respectively, and the directions thereof also are equal to each other, then M is given as a unit matrix. Thus, M, V can be calculated by designating only one point each on the display screens 5010 and 5020. While the three points are designated on the respective geographical information as described above, if the above-mentioned hypothesis is established, then the number of the designated points may be either one point or two points. Moreover, in order to reduce an error in the coordinate translation, it is possible to increase an accuracy of the calculate coordinate translation matrix 1001 by designating four points or more.

In the translate inner point 1002, the coordinate translation is effected on each inner point 4020 of the old link information 1011 by using the M and V obtained at the calculate coordinate translation matrix 1001, thereby obtaining points on the current geographical information 1022. FIG. 3B shows the state in which a translated inner point Zi=M·Xi+V (i=0, 1, 2) has been obtained as a point on the current geographical information 1022 after the coordinate translation has been effected on each inner point Xi (i=0, 1, 2) of the old geographical information 1021.

The extract area from geographical information 1003 extracts the closed area of the current geographical information 1022 by using the translated inner point Zi obtained in the translate inner point 1002 and the current geographical information 1022. If geographical information is stored in the vector format, then the closed area is stored in the geographical information of the vector format itself so that the closed area including the translated inner point can be extracted by judging "whether or not each closed area includes the translated inner point". If on the other hand geographical information is stored in the image format, then a closed area can be extracted by using an image processing technology. As the image processing technology, "ALGORITHM FOR EXTRACTING A CLOSED AREA INCLUDING SPECIFIC POINT" for extracting a contour line constructing an area by tracing black point sequences on an image is disclosed by "IMAGE PROCESSING AND PATTERN MEASURING TECHNOLOGY" edited by THE JAPAN SOCIETY OF MECHANICAL ENGINEERS (pp. 82–83, published by Asakura Shoten, 1986). By using the above-mentioned algorithm, it is possible to obtain a closed area including a specific point (inner point in this embodiment) from the geographical information of the image format. That is, regardless of whether the geographical information is stored in the vector format or the image format, there can be obtained the closed area including the inner point Zi. FIG. 3B shows the case in which a closed area (Z00, Z01, Z02, Z03) has been obtained as the closed area including the inner point Z0 in the current geographical information 22.

To simplify the description and the drawings, let us describe the present invention on the assumption that a closed area (Zi0, Zi1, Zi2, Zi3) is obtained with respect to the inner point Zi (i=0, 1) of each translation. However, FIG. 3B shows the case that a corresponding closed area does not exist with respect to the translated inner point Z2 in the current geographical information 1022. Incidentally, the following description of this embodiment can be similarly applied to a closed area which is generally shaped as a polygon.

The compare similarity level of area shape 1004 compares a similarity between "the closed area of the current geographical information 1022 obtained in the extract area from geographical information 1003" and "the closed area 4030 of the old link information 1011" based on the translated coordinates (M, V) obtained in the calculate coordinate translation matrix 1001. Initially, a closed area translated into the coordinate system of the current geographical information 1022 is calculated by effecting the coordinate translation processing (coordinate translation by M, V) on the "closed area 4030 of the old link information 1011". In the following description, the closed area which results from effecting the coordinate translation on the closed area 4030 (Xi0, Xi1, Xi2, Xi3) of the old link information 1011 will be described as (Yi0, Yi1, Yi2, Yi3). Here, Yij=M·Xij+V is established. The thus obtained closed area (Yi0, Yi1, Yi2, Yi3) of the same coordinate system and the closed area (Zi0, Zi1, Zi2, Zi3) obtained by the extract area from geographical information 1003 are compared in similarity level of area shape. The similarity level of area shape is compared by using a DP (Dynamic Programming) matching which is well-known in speech recognition and image recognition. The DP matching is an algorithm in which audio information or image information is converted into a frequency component by a mathematical method, a concept of distance is defined between frequency components and a similarity of audio information or image information is judged based on a magnitude of distance. Detailed contents of the DP matching is described in "PATTERN UNDERSTANDING" edited by Yoshiaki Shirai (pp. 202–211, published by OHMSHA LTD., 1987). In this embodiment, a distance obtained by the DP matching is assumed to be L, and a proper interval (a, b) (a>0) is assumed to be on a straight line. Then, a similarity of level between the closed areas is judged as follows. In this case, the distance L is a minimum value of sum total of distances between point sequences corresponding to various routes ranging from a starting point (a1, b1) to an ending point (al, bJ) when a point sequence (ai, bj) is composed of two data strings {ai} and {bj} which are to be compared in similarity level. The smaller the value of L becomes, the more the change of the two data strings becomes similar. Accordingly, it is indicated that a similarity level of the two judged targets is high, (1) If the distance L is contained in the interval [0,a]: it is judged as the same area.

(2) If the distance L is contained in the interval (a, b): it is judged as the uncertain area.

(3) If the distance L is contained in the interval [b, ]: it is judged as the failure area.

Incidentally, the algorithm used in the compare similarity level of area shape 1004 is not limited to the DP matching, and may be an algorithm using comparison of area and the number of vertexes of a closed area. There can be any kinds of algorithms for comparing a similarity level of closed area.

A compare update day 1005 compares update days of the old link information 1011 and the residents information 1030. Latest update day stored in the old link information 1011 and the update day 1033 of the corresponding residents information 1030 are compared and grouped as follows:

(1) Residents information≦old link information: this is the case in which residents information is older than the link information or the case for the same day.

(2) Residents information>old link information: this is the case in which residents information is newer than link information, and there is then the large possibility that new residents information will not be reflected on the link information.

Incidentally, the method of comparing update days is not limited to the above-mentioned methods.

A group link information 1006 groups the residents information 1030 and the old link information 1011 based on a table of link information group shown in FIG. 4 which is determined by the compared result of the compare similarity level of area shape 1004 and compared result of the compare update day 1005, and generates the certain link information 1012, the uncertain link information 1013 and the failure link information 1014. In the certain link information 1012 and the uncertain link information 1013, there are stored the inner point and the closed area obtained by the extract area from geographical information 1003 together with ID, residents ID and update day. Although ID, residents ID and update day are stored in the failure link information 1014, it is frequently observed that the inner point and the closed area are stored in or not stored in the failure link information 1014. When each record of the residents information 1030 is made corresponding to the old geographic information 1020 by the old link information 1011, the inner point and the closed area obtained by the extract area from geographic information 1003 are stored in the failure link information 1014 (z2 is stored in the failure link information 1014 as the inner point in the example of FIG. 3B). In other cases, nothing is stored in an inner point 4022 and a closed area 4032 of the failure link information 1014. FIG. 3C shows an example of stored results of link information according to this processing.

A display anchor area 1007 displays anchor areas on the current geographic information 1022 by using the link information 1010 obtained in the group link information 1006 in the different forms in response to the similarity level of area shape. For example, anchor areas of the current link information 1012 and the uncertain link information 1013 are displayed in blue and yellow, respectively. FIG. 5 shows an example of a displayed picture of the anchor area.

Display residents information 1008 groups the residents information 1030 by using the link information 1010 obtained in the group link information 1006, and displays a grouped result on the display screen. Of the residents information, residents information in which the value of the residents ID 1031 is stored as residents ID 4042 of the uncertain link information 1013 or the failure link information 1014 are displayed on a display screen 5040 of "UNCERTAIN/FAILURE RESIDENTS INFORMATION" shown in FIG. 5 in the form of a list.

Incidentally, the class ("CERTAIN" OR "UNCERTAIN" OR "FAILURE") of the link information relative to the current geographic information 1022 may be changed at the record unit of the link information when the operator operates the display screen. For example, the operator double-clicks a resident name ("大阪花子" in FIG. 5) displayed on the display screen 5040 of the "UNCERTAIN/FAILURE RESIDENTS INFORMATION") by the mouse 2030 of FIG. 2. Then, the system side judges that the operator determines the link information, and moves the corresponding record of the selected uncertain link information to the record of the certain link information 1012. Then, the resident name of the certain residents information is deleted from the display screen 5040 of the "UNCERTAIN/FAILURE RESIDENTS INFORMATION". Thus, the uncertain link information can be made certain with ease.

Incidentally, while the certain link information 1012, the uncertain link information 1013 and the failure link information 1014 are comprised of different tables as shown in FIG. 3C in the embodiment of the present invention, these link information may all be stored in one table and each record may hold a flag indicating that the record is "certain", "uncertain" or "failure".

Further, in the above-mentioned embodiment, while the present invention is applied to the geographic information system by way of example, the present invention is not limited thereto, and may be applied to a system which holds link information in which area information and attribute information are associated with each other. For example, as a system similar to the geographic information system, there is known a system in which a document and database are associated with each other by link information. Since the document has a square area (area information) called cell, it is to be understood that the processing in FIG. 1 can be similarly applied to the document. That is, the square area on the document is processed in a manner of FIG. 1, whereby a maintenance of link information in which the document and the database are associated with each other can be realized similarly.

Incidentally, in a document or the like, it is frequently observed that characters such as entry names are described in the cell. Therefore, in the case of the document, a processing of "if character recognized results within two square areas agree with each other, then it is determined that area information become coincident" may be added to the internal processing of the compare similarity level of area shape 1004 of the area information of FIG. 1. If the above-mentioned processing is added, then it is possible to increase an accuracy required in changing the link information of the link information maintenance system in which a document is a target. Also, when geographic information includes characters in a map, a link information change accuracy can be increased by executing the similar processing.

As described above, according to the present invention, since a similarity level between two closed areas is judged on the basis of position information designated in the old first area information and the current second area information by the operator, a corresponding relationship of closed areas on the map can be judged even between area information having different scales or directions, thereby making it possible to change the link information. Therefore, even the previously-registered link information can be changed. If current link information is generated considering compared and grouped results obtained by the registration or update day, then it is possible to generate current link information more accurately. If attribute information or the like is displayed in the different modes in response to the class indicating whether the current link information is certain or not and the class can be changed by a predetermined operation, then uncertain link information, for example, can be made certain with ease, and the link information can be changed with ease. Thus, it becomes possible to support the processing in which link information updated results are confirmed by the operator. Further. If newly-registered attribute information of attribute information is displayed, then attribute information that the operator should create new link information can be recognized with ease. If the similarity level is judged by using character recognized results within the closed area and current link information is generated, then the current link information can be generated more accurately. Further, even when old and current area information are different in data form such as when old area information is in the vector format and current area information is in the image format, link information can be changed. As described above, according to the present invention, it is possible to reduce the number of steps of a link maintenance processing in the geographic information system.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An area information display system for displaying area information and attribute information corresponding to said area information using link information indicative of a correspondence relationship between said area information and said attribute information, comprising:

a storage device storing a program;

a controller coupled to said storage device to operate with said program, said controller generating, based on a relation between first area information and second area information associated with said first area information and first link information indicative of a correspondence relationship between said first area information and said first attribute information, second link information indicative of a correspondence relationship between said second area information and said first attribute information, and distinguishably outputting relevant ones of the attribute information correlated with said second link information included in said second area information in accordance with the class of said generated second link information; and a display device coupled to said controller and displaying an output from said controller.

2. An area information display system according to claim 1, wherein said second link information class includes link information which has bound said correspondence relationship, pending link information which is presumed to have said correspondence relationship and irrelevant link information which could not have said correspondence relationship.

3. An area information display system according to claim 1, wherein said controller displays a position corresponding to said attribute information with a color corresponding to said second link information class.

4. An area information display system according to claim 1, wherein said controller displays said attribute information correlated with a closed area on said second area information and correlated with said attribute information when said closed area correlated with said attribute information is designated.

5. An area information display system according to claim 1, wherein said controller displays a character representing said attribute information in a type format corresponding to the class of said second link information.

6. An area information display system according to claim 1, wherein said controller generates said second link information based on similarity between said first area information and said second area information.

7. An area information display method for displaying area information and attribute information corresponding to said area information using link information indicative of a correspondence relationship between said area information and said attribute information, comprising the steps of:

generating, based on a relation between first area information and second area information associated with said first area information and first link information indicative of a correspondence relationship between said first area information and first attribute information, second link information indicative of a correspondence relationship between said second area information and said first attribute information; and distinguishably displaying relevant ones of the attribute information correlated with said second link information included in said second area information in accordance with the class of said generated second link information on a display device.

8. An area information display method according to claim 7, wherein said second link information class includes link information which has bound said correspondence relationship, pending link information which is presumed to have said correspondence relationship and irrelevant link information which could not have said correspondence relationship.

9. An area information display method according to claim 8, wherein said displaying step displays a position corresponding to said attribute information with a color corresponding to said second link information class.

10. An area information display method according to claim 8, wherein said displaying step displays a character representing said attribute information in a type format corresponding to the class of said second link information.

11. An area information display method according to claim 7, wherein said displaying step displays said attribute information correlated with a closed area on said second area information and correlated with said attribute information when said closed area correlated with said attribute information is designated.

12. An area information display method according to claim 7, wherein said generating step generates said second link information based on similarity between said first area information and said second area information.

13. A program product storable on a computer-readable recording medium, and said program product implementing by the computer the processes of:

generating, based on a relation between first area information and second area information associated with said first area information and first link information indicative of a correspondence relationship between said first area information and first attribute information, second link information indicative of a correspondence relationship between said second area information and said first attribute information; and distinguishably displaying relevant ones of the attribute information correlated with said second link information included in said second area information in accordance with the class of said generated second link information on a display device.

14. A program product according to claim 13, wherein said second link information class includes link information which has bound said correspondence relationship, pending link information which is presumed to have said correspondence relationship and irrelevant link information which could not have said correspondence relationship.

15. A program product according to claim 13, wherein said displaying process displays a position corresponding to said attribute information with a color corresponding to said second link information class.

16. A program product according to claim 13, wherein said displaying process displays said attribute information correlated with a closed area on said second area information and correlated with said attribute information when said closed area correlated with said attribute information is designated.

17. A program product according to claim 13, wherein said displaying step displays a character representing said attribute information in a type format corresponding to the class of said second link information.

18. A program product according to claim 13, wherein said generating step generates said second link information based on similarity between said first area information and said second area information.

* * * * *